(12) United States Patent
Serban et al.

(10) Patent No.: US 8,912,110 B2
(45) Date of Patent: Dec. 16, 2014

(54) CATALYST FOR CONVERSION OF HYDROCARBONS

(75) Inventors: Manuela Serban, Glenview, IL (US); Mark P. Lapinski, Aurora, IL (US)

(73) Assignee: UOP LLC, Des Plaines, IL (US)

(*) Notice: Subject to any disclaimer, the term of this patent is extended or adjusted under 35 U.S.C. 154(b) by 95 days.

(21) Appl. No.: 13/547,351

(22) Filed: Jul. 12, 2012

(65) Prior Publication Data

US 2013/0261363 A1    Oct. 3, 2013

Related U.S. Application Data

(60) Provisional application No. 61/617,201, filed on Mar. 29, 2012.

(51) Int. Cl.
*B01J 31/00* (2006.01)
*B01J 37/00* (2006.01)
*B01J 27/138* (2006.01)
*B01J 27/132* (2006.01)
(Continued)

(52) U.S. Cl.
USPC ........... 502/102; 502/226; 502/228; 502/230; 502/231; 502/304; 502/328; 502/330; 502/332; 502/333; 502/334; 502/341; 208/134; 208/138; 208/139; 208/140

(58) Field of Classification Search
USPC ......... 502/102, 226, 228, 230, 231, 304, 328, 502/330, 332–334, 341, 346; 208/134, 208/138–140
See application file for complete search history.

(56) References Cited

U.S. PATENT DOCUMENTS 3,436,335 A * 4/1969 Maziuk ........................ 208/65
3,892,657 A   7/1975 Wilhelm
(Continued)

FOREIGN PATENT DOCUMENTS

AU    9228357    5/1993
EP    0705238 B1    10/1999
(Continued)

OTHER PUBLICATIONS

Chen, "Problems and Countermeasures in Long-Term Running CCR Unit", Petroleum Processing and Petrochemicals, v 41, n 5, p. 19-24, May 2010. Language: Chinese; ISSN: 10052399; Publisher: Research Institute of Petroleum Processing, SINOPEC.

(Continued)

*Primary Examiner* — Patricia L Hailey
(74) *Attorney, Agent, or Firm* — Mark Goldberg

(57) ABSTRACT

One embodiment is a catalyst for catalytic reforming of naphtha. The catalyst can have a noble metal including one or more of platinum, palladium, rhodium, ruthenium, osmium, and iridium, an alkali or alkaline-earth metal, a lanthanide-series metal, and a support. Generally, an average bulk density of the catalyst is about 0.300 to about 1.00 gram per cubic centimeter. The catalyst has a platinum content of less than about 0.375 wt %, a tin content of about 0.1 to about 2 wt %, a potassium content of about 100 to about 600 wppm, and a cerium content of about 0.1 to about 1 wt %. The lanthanide-series metal can be distributed at a concentration of the lanthanide-series metal in a 100 micron surface layer of the catalyst less than two times a concentration of the lanthanide-series metal at a central core of the catalyst.

14 Claims, 1 Drawing Sheet

(51) Int. Cl.
*B01J 27/13* (2006.01)
*B01J 27/125* (2006.01)
*B01J 23/02* (2006.01)
*B01J 23/06* (2006.01)
*B01J 23/10* (2006.01)
*B01J 23/58* (2006.01)
*B01J 23/56* (2006.01)
*B01J 23/42* (2006.01)
*B01J 23/44* (2006.01)
*B01J 23/70* (2006.01)
*B01J 23/72* (2006.01)
*B01J 23/90* (2006.01)
*B01J 23/96* (2006.01)
*C10G 35/04* (2006.01)
*C10G 35/06* (2006.01)
*C08F 4/02* (2006.01)
*C08F 4/60* (2006.01)

(56) References Cited

U.S. PATENT DOCUMENTS

| | | |
|---|---|---|
| 3,929,431 A | 12/1975 | Koh et al. |
| 4,064,037 A | 12/1977 | Graven et al. |
| 4,198,287 A | 4/1980 | Hemler, Jr. et al. |
| 4,227,993 A * | 10/1980 | Engelhard et al. ............ 208/139 |
| 4,230,923 A | 10/1980 | Jeppsson |
| 4,309,280 A | 1/1982 | Rosinski et al. |
| 4,401,557 A * | 8/1983 | Juguin et al. ................. 208/139 |
| 4,440,627 A | 4/1984 | Markley |
| 4,482,637 A | 11/1984 | Buss et al. |
| 4,487,848 A | 12/1984 | Robinson et al. |
| 4,522,935 A | 6/1985 | Robinson et al. |
| 4,529,505 A | 7/1985 | Robinson et al. |
| 4,608,356 A | 8/1986 | Buss et al. |
| 4,975,178 A | 12/1990 | Clem et al. |
| 5,211,838 A | 5/1993 | Staubs et al. |
| 5,221,463 A | 6/1993 | Kamienski et al. |
| 5,342,907 A | 8/1994 | Cann et al. |
| 5,543,532 A | 8/1996 | Kourtakis et al. |
| 5,565,090 A | 10/1996 | Gosling et al. |
| 5,858,908 A | 1/1999 | Bogdan et al. |
| 5,879,537 A | 3/1999 | Peters |
| 5,883,032 A | 3/1999 | Bogdan et al. |
| 5,885,443 A | 3/1999 | Bogdan et al. |
| 5,958,216 A | 9/1999 | Glover |
| 6,013,173 A | 1/2000 | Bogdan |
| 6,034,018 A | 3/2000 | Sechrist et al. |
| 6,036,845 A | 3/2000 | Funk et al. |
| 6,059,960 A * | 5/2000 | Bogdan ........................ 208/139 |
| 6,106,696 A | 8/2000 | Fecteau et al. |
| 6,123,834 A | 9/2000 | Kao et al. |
| 6,315,892 B1 | 11/2001 | Le Peltier et al. |
| 6,358,400 B1 | 3/2002 | Bogdan et al. |
| 6,419,820 B1 * | 7/2002 | Bogdan et al. ................ 208/138 |
| 6,624,116 B1 | 9/2003 | Bharadwaj et al. |
| 6,780,814 B2 * | 8/2004 | Ma et al. ....................... 502/224 |
| 6,809,061 B2 * | 10/2004 | Bogdan et al. ................ 502/227 |
| 6,884,340 B1 | 4/2005 | Bogdan |
| 7,037,871 B1 | 5/2006 | Galperin et al. |
| 7,223,332 B1 | 5/2007 | Tertel |
| 7,909,988 B2 | 3/2011 | Lapinski et al. |
| 2004/0102315 A1 | 5/2004 | Bailie et al. |
| 2006/0013763 A1 | 1/2006 | Baird et al. |
| 2006/0102520 A1 | 5/2006 | Lapinski et al. |
| 2006/0213811 A1 | 9/2006 | Clay et al. |
| 2006/0252971 A1 | 11/2006 | Pilliod et al. |
| 2007/0189935 A1 | 8/2007 | Yaluris et al. |
| 2010/0116714 A1 | 5/2010 | Lapinski et al. |
| 2011/0136655 A1 | 6/2011 | Lapinski et al. |
| 2013/0015103 A1 * | 1/2013 | Lapinski et al. .............. 208/138 |

FOREIGN PATENT DOCUMENTS

| | | |
|---|---|---|
| WO | 9312202 A1 | 6/1993 |
| WO | 0014180 A1 | 3/2000 |
| WO | 0206426 A1 | 1/2002 |
| WO | 2004022212 A2 | 3/2004 |
| WO | 2004039720 A2 | 5/2004 |
| WO | 2005105957 A1 | 11/2005 |
| WO | 2013/148397 * | 10/2013 ............... B01J 23/63 |

OTHER PUBLICATIONS

De Miguel, "Effect of the Addition of Alkali Metals on the Metallic Phase of Pt/Al2O3 Catalysts", Catalysis Letters 32 (1995) 281-291.
U.S. Appl. No. 13/433,617, filed Mar. 29, 2012, Lapinski.
U.S. Appl. No. 13/547,335, filed Jul. 12, 2012, Serban.

* cited by examiner

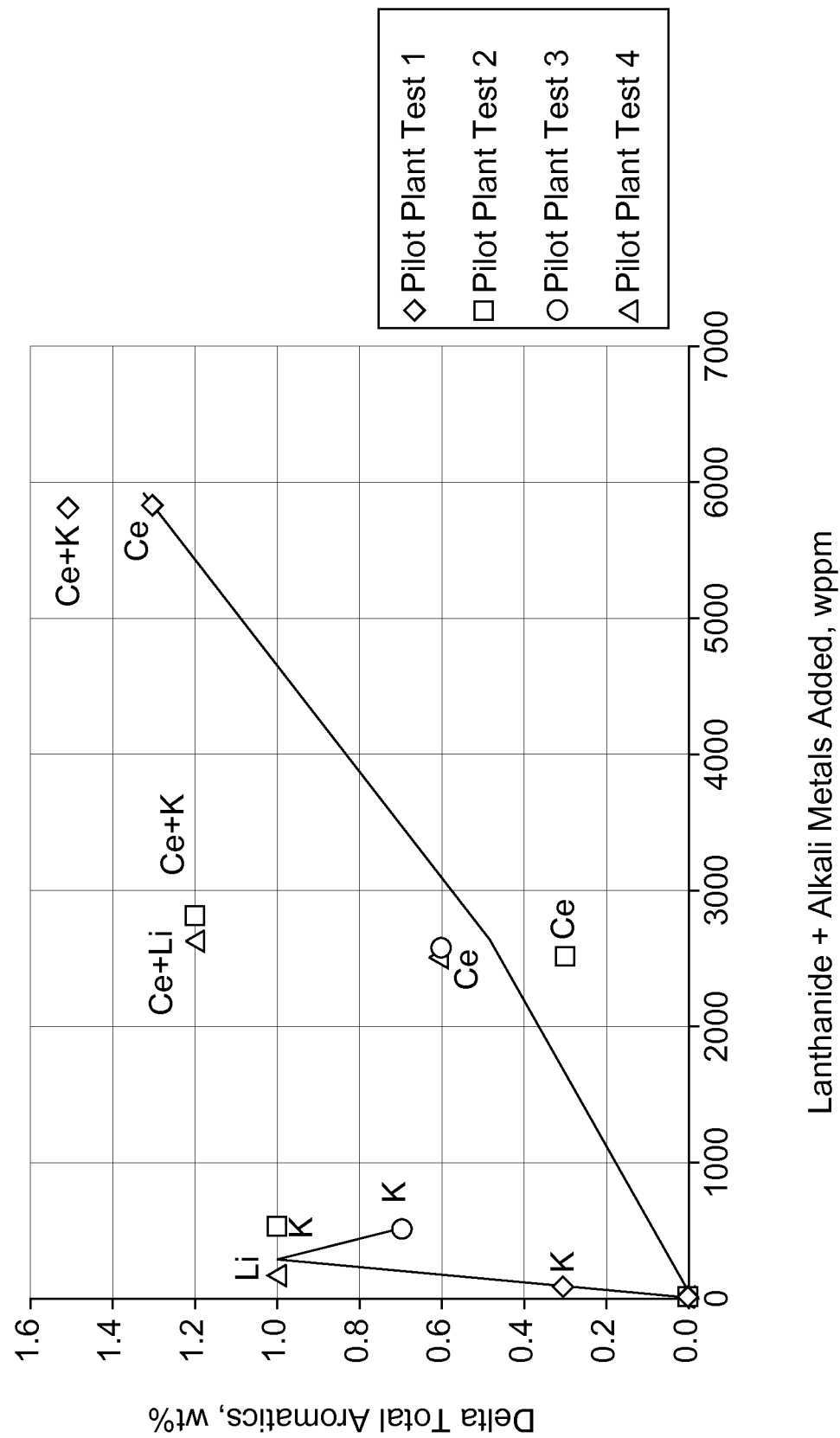

CATALYST FOR CONVERSION OF HYDROCARBONS

CROSS-REFERENCE TO RELATED APPLICATION

This application claims priority from Provisional Application No. 61/617,201 filed Mar. 29, 2012, the contents of which are hereby incorporated by reference.

BACKGROUND OF THE INVENTION

This invention generally relates to an improved catalyst for the conversion of hydrocarbons. More specifically, this invention relates to a reforming catalyst for the catalytic reforming of gasoline-range hydrocarbons that results in increased aromatics production.

The subject of the present invention is a novel dual-function catalyst, characterized by a multimetallic combination of three or more metal components in specified concentrations on the finished catalyst, and its use in hydrocarbon conversion with increased aromatics production. Catalysts having both a hydrogenation-dehydrogenation function and a cracking function are used widely in many applications, particularly in the petroleum and petrochemical industry, to accelerate a wide spectrum of hydrocarbon-conversion reactions. The cracking function generally relates to an acid-action material of the porous, adsorptive, refractory-oxide type which is typically utilized as the support or carrier for a heavy-metal component, such as the Group VIII (IUPAC 8-10) metals, which primarily contribute the hydrogenation-dehydrogenation function. Other metals in combined or elemental form can influence one or both of the cracking and hydrogenation-dehydrogenation functions.

In another aspect, the present invention comprehends improved processes that emanate from the use of the novel catalyst. These dual-function catalysts are used to accelerate a wide variety of hydrocarbon-conversion reactions such as dehydrogenation, hydrogenation, hydrocracking, hydrogenolysis, isomerization, desulfurization, cyclization, alkylation, polymerization, cracking, and hydroisomerization. In a specific aspect, an improved reforming process utilizes the subject catalyst to increase selectivity to gasoline and aromatics products.

Catalytic reforming involves a number of competing processes or reaction sequences. These include dehydrogenation of cyclohexanes to aromatics, dehydroisomerization of alkylcyclopentanes to aromatics, dehydrocyclization of an acyclic hydrocarbon to aromatics, hydrocracking of paraffins to light products boiling outside the gasoline range, dealkylation of alkylbenzenes and isomerization of paraffins. Some of the reactions occurring during reforming, such as hydrocracking which produces light paraffin gases, have a deleterious effect on the yield of products boiling in the gasoline range. Process improvements in catalytic reforming thus are targeted toward enhancing those reactions effecting a higher yield of the gasoline fraction at a given octane number.

It is of critical importance that a dual-function catalyst exhibits the capability both to initially perform its specified functions efficiently and to perform them satisfactorily for prolonged periods of time. The parameters used in the art to measure how well a particular catalyst performs its intended functions in a particular hydrocarbon reaction environment are activity, selectivity and stability. In a reforming environment, these parameters are defined as follows: (1) Activity is a measure of the ability of the catalyst to convert hydrocarbon reactants to products at a designated severity level, with severity level representing a combination of reaction conditions: temperature, pressure, contact time, and hydrogen partial pressure. Activity typically is designated as the octane number of the pentanes and heavier ("$C_5+$") product stream from a given feedstock at a given severity level, or conversely as the temperature required to achieve a given octane number. (2) Selectivity refers to the percentage yield of petrochemical aromatics or $C_5+$ gasoline product from a given feedstock at a particular activity level. (3) Stability refers to the rate of change of activity or selectivity per unit of time or of feedstock processed. Activity stability generally is measured as the rate of change of operating temperature per unit of time or of feedstock to achieve a given C5+ product octane, with a lower rate of temperature change corresponding to better activity stability, since catalytic reforming units typically operate at relatively constant product octane. Selectivity stability is measured as the rate of decrease of $C_5+$ product or aromatics yield per unit of time or of feedstock.

Some catalysts may have both a hydrogenation-dehydrogenation function and a cracking function and are useful for accelerating a wide spectrum of hydrocarbon-conversion reactions. Different components, such as the carrier, may contribute to the cracking function while other portions, such as deposited metals, may contribute to the hydrogenation-dehydrogenation function. Some components contribute to both the cracking and hydrogenation-dehydrogenation functions. Typically, dual function catalysts are used to accelerate a variety of hydrocarbon conversion reactions, such as dehydrogenation, hydrogenation, hydrocracking, hydrogenolysis, isomerization, desulfurization, cyclization, alkylation, polymerization, cracking, and hydroisomerization.

Generally, it is desirable to have flexibility with catalyst functionality for utilizing in various processes, such as reforming. In one exemplary reforming process, increasing the yield of one or more $C_5^+$ hydrocarbons, hydrogen, and aromatic yields is desired. Optionally, the acidity of the catalyst can be altered by adding a metal and/or other elements to the catalyst. Generally, modification of the acid function results in reduced cracking of the alkanes to $C_3$ and $C_4$ light ends allowing increased selectivity to the formation of aromatics. Modification of the metal function may also occur resulting in the reduction of alkane cracking to methane and ethane. There can also be a reduction in the dealkylation reactions of aromatics leaving heavier and more valuable $C_8^+$ aromatics.

Beside the yields, the activity of a catalyst may enable obtaining a commercially useful conversion level without employing additional quantities of catalyst or using excessively high temperatures, which can lead to undesired higher costs. Higher catalyst activity can also be utilized to process greater quantities of feed or to increase conversion, and therefore increase the production of valuable products.

This invention relates to new catalytic materials that are more selective towards reforming of naphtha feeds compared to those in the art. In one embodiment, the catalytic material comprises a refractory aluminum oxide support, a metal from the platinum group, tin, a halogen element, at least one lanthanide element and one or more alkali metals from Group 1, or one or more alkaline earth metals from Group 2, or mixtures thereof of Group 1 and Group 2 metals. A catalyst with a combination of a lanthanide metal and alkali metals, such as, Li, Na, K, was unexpectedly found to be more selective towards aromatics compared to reference reforming catalysts.

SUMMARY OF THE INVENTION

One exemplary embodiment of the invention can be a catalyst for catalytic reforming of naphtha. This catalyst comprises a refractory aluminum oxide support, a metal from the platinum group, tin and a halogen element, at least one lanthanide element as well as one or more alkali metals or one or more alkaline earth metals or combinations thereof. The catalyst can have a noble metal including one or more of platinum, palladium, rhodium, ruthenium, osmium, and iridium, a lanthanide-series metal including one or more elements of atomic numbers 57-71 of the Periodic Table, alkali metals from Group 1, or a combination thereof of Group 1 metals, or alkali earth metals from Group 2, or a combination thereof of Group 2 metals, or mixtures thereof of Group 1 and Group 2 metals, a halogen element and a support. Generally, an average bulk density of the catalyst is about 0.300 to about 1.00 gram per cubic centimeter. In addition, the catalyst contains 0.05 to 2 wt % metal from the lanthanide-series metals, 50 to 1000 wppm alkali metals or 250 to 5000 wppm alkali earth metals, or a mixture thereof. Moreover, the lanthanide-series metal can be distributed at a concentration of the lanthanide-series metal in a 100 micron surface layer of the catalyst less than about two times a concentration of the lanthanide-series metal at a central core of the catalyst.

Another exemplary embodiment can be a catalyst for catalytic reforming of naphtha. The catalyst can include platinum, cerium, potassium, chloride, and a support. Additionally, an average bulk density of the catalyst is about 0.300 to about 1.00 gram per cubic centimeter, a platinum content less than about 0.375 wt %, a cerium content less than about 0.6 wt %, a potassium content less than about 600 wppm, and a chloride content less than about 1.1 wt %.

A further exemplary embodiment can be a reforming process. The reforming process can include charging a hydrocarbon feedstock and a hydrogen-rich gas to a reforming zone, and contacting the hydrocarbon feedstock and the hydrogen rich gas in a reactor in the reforming zone. Usually, the catalyst includes a noble metal including one or more of platinum, palladium, rhodium, ruthenium, osmium, and iridium, a halide, a Group 14 metal such as Sn, Ge and a support. Generally, an average bulk density of the catalyst is about 0.300 to about 1.00 gram per cubic centimeter.

In one exemplary embodiment, an alkali metal and a lanthanide-series metal are added to a spherical porous alumina carrier that obtains high yields of one or more $C_5^+$ hydrocarbons including aromatics. Specifically, an atomic ratio of the lanthanide-series metal:alkali metal and lanthanide-series metal:noble metal are defined that provide yield benefits.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as metals, and sulfur and nitrogen compounds. The stream can also include aromatic and non-aromatic hydrocarbons. Moreover, the hydrocarbon molecules may be abbreviated $C_1, C_2, C_3 \ldots C_n$ where "n" represents the number of carbon atoms in the one or more hydrocarbon molecules. Furthermore, a superscript "+" or "−" may be used with an abbreviated one or more hydrocarbons notation, e.g., $C_3^+$ or $C_3^-$, which is inclusive of the abbreviated one or more hydrocarbons. As an example, the abbreviation "$C_3^+$" means one or more hydrocarbon molecules of three and/or more carbon atoms.

As used herein, the term "substantially" can mean an amount of at least generally about 80%, preferably about 90%, and optimally about 99%, by mole, of a compound or class of compounds in a stream.

As used herein, the term "uniform in composition" can mean that an unlayered support has no concentration gradients of the species inherent to its composition, and is substantially homogeneous in composition. If the support is a mixture of two or more refractory materials, the relative amounts of these materials may be constant and uniform throughout the entire support.

As used herein, the term "surface layer" means the layer of a catalyst particle adjacent to the surface of the particle. Often, a concentration of surface-layer metal tapers off from the surface to the center of the catalyst particle.

As used herein, the term "layer" is a stratum of a catalyst particle of substantially uniform thickness at a substantially uniform distance from the surface of the catalyst particle.

As used herein, the term "central core" is a core of a catalyst particle representing 50% of the diameter of the catalyst particle.

As used herein, the term "diameter" is defined as the minimum regular dimension through the center of a catalyst particle, e.g., this dimension would be the diameter of the cylinder of an extrudate.

As used herein, the term "halide" can mean an ion, such as the chlorine, that picks up one electron to form an anion, e.g., chloride.

As used herein, the term "loss on ignition" may be abbreviated "LOI".

As used herein, the term "average bulk density" may be abbreviated "ABD".

As used herein, the term "research octane number" may be abbreviated "RON".

As used herein, the term "weight percent" may be abbreviated "wt %".

As used herein, the term "meter-squared per gram" may be abbreviated "$m^2/g$".

As used herein, the term "millimeter" may be abbreviated "mm"

As used herein, the term "gram per cubic centimeter" may be abbreviated "g/cc" or "$g/cm^3$".

As used herein, the term "atomic ratio" may be used interchangeably with "mole ratio".

As used herein, the terms "alkane" and "paraffin" may be used interchangeably.

As used herein, the terms "alkene" and "olefin" may be used interchangeably.

As used herein, the terms "cycloalkane" and "naphthene" may be used interchangeably.

BRIEF DESCRIPTION OF THE DRAWING

The FIGURE shows that when comparing at a given total additive level, the largest benefit in total aromatics occurs for a combination of lanthanide metal and alkali metal.

DETAILED DESCRIPTION

The embodiments disclosed herein can provide a catalyst suitable for reforming including a support having one or more metals incorporated or deposited thereon. The catalyst can be characterized by specified ratios of components. Generally, the metals include a noble metal, a Group 14 metal of the Periodic Table, an alkali or an alkaline earth metal and a lanthanide series metal of atomic numbers 57-71 of the Periodic Table. Typically, the catalyst is prepared by adding a lanthanide metal, an alkali or an alkaline earth metal with a metal of Groups 8-10 of the Periodic Table, typically platinum, in a hydrochloric acid solution and impregnating the alumina support in single or multiple steps. Next, the catalyst may be finished with oxychlorination and reduction treatments. Some of the materials and methods of preparing the catalyst is disclosed in, e.g., U.S. Pat. No. 6,809,061, incorporated by reference herein, in its entirety.

Usually, the support is a porous, adsorptive, high-surface area support having a surface area of about 25 to about 500 m$^2$/g. The porous support material should also be uniform in composition and relatively refractory to the conditions utilized in the hydrocarbon conversion process. Thus, support materials can include one or more of (1) a refractory inorganic oxide such as an alumina, a magnesia, a titania, a zirconia, a chromia, a zinc oxide, a thoria, a boria, a silica-alumina, a silica-magnesia, a chromia-alumina, an alumina-boria, and a silica-zirconia; (2) a ceramic, a porcelain, and a bauxite; (3) a silica, a silica gel, a silicon carbide, a clay and a synthetically prepared or naturally occurring optionally acid-treated silicate; (4) a crystalline zeolitic aluminosilicate, such as an X-zeolite, a Y-zeolite, a mordenite, and an L-zeolite, either in hydrogen form or preferably in nonacidic form; and (5) a non-zeolitic molecular sieve, such as an aluminophosphate or a silico-alumino-phosphate.

Preferably, the support includes one or more inorganic oxides, with the preferred inorganic oxide being alumina A suitable alumina material may include a crystalline alumina known as the gamma-, eta-, and theta-alumina, with gamma- or eta-alumina being the most preferred. The preferred refractory inorganic oxide can have an apparent bulk density of generally about 0.300 to about 1.00 g/cm$^3$, preferably about 0.550 to about 0.750 g/cm$^3$. The surface area characteristics may include an average pore diameter of about 20 to about 300 angstroms, a pore volume of about 0.1 to about 1 cm$^3$/g, and a surface area of about 100 to about 500 m$^2$/g.

One exemplary alumina is disclosed in, e.g., U.S. Pat. No. 3,852,190 and U.S. Pat. No. 4,012,313 as a by-product from a Ziegler higher alcohol synthesis reaction as described in, e.g., U.S. Pat. No. 2,892,858, hereinafter referred to as a "Ziegler alumina" A high-purity pseudoboehmite, after calcination at a high temperature, can provide a gamma-alumina of high purity.

The alumina powder can be formed into particles of any desired shape, such as spheres, rods, pills, pellets, tablets, granules, and cylindrical and multilobe extrudates. Typically, such particles have at least one regular dimension, usually a circular cross-section and referred to herein as a "diameter," of about 0.7 to about 3.5 mm.

Usually, the catalyst support is a spherical particle, with a preferred diameter of about 0.7 to about 3.5 mm. The alumina sphere can be manufactured by an oil-drop method. Typically, the oil-drop includes forming an alumina hydrosol and reacting aluminum metal with hydrochloric acid, combining the resulting hydrosol with a suitable gelling agent, and dropping the resultant mixture into an oil bath maintained at elevated temperatures. The droplets of the mixture can remain in the oil bath until they set and form hydrogel spheres. The spheres may then be continuously withdrawn from the oil bath and typically subjected to specific aging treatments in oil and an ammoniacal solution to further improve their physical characteristics. The resulting gelled and aged particles may then be washed and dried at a temperature of about 205° to about 1,500° C. and be subjected to a calcination at a temperature of about 450° to about 810° C. for a period of about 1 to about 20 hours. This treatment affects conversion of the alumina hydrogel to the corresponding crystalline gamma-alumina, and is disclosed in, e.g., U.S. Pat. No. 2,620,314.

Alternatively, the support may be a cylindrical or multilobe extrudate, preferably prepared by mixing an alumina powder with water and suitable peptizing agents, such as hydrochloric or nitric acids, until an extrudable dough is formed. The amount of water added to form the dough is typically sufficient to give an LOI of about 500° C., of about 45 to about 65%, by weight, with a value of about 55%, by weight, being preferred. Generally, the acid addition rate is sufficient to provide about 2 to about 7%, by weight, of the volatile-free alumina powder used in the mix, with a value of about 3 to about 4%, by weight, being preferred. The resulting dough can be extruded through a suitably sized die to form extrudate particles. These particles may then be dried at a temperature of about 260° to about 427° C. for a period of about 0.1 to about 5 hours to form the extrudate particles. Generally, the diameter of the extrudate particles can be about 0.7 to about 3.5 mm, preferably with a length-to-diameter ratio of about 1:1 to about 5:1.

Generally, a noble metal is incorporated in the catalyst. The noble metal may include one or more of platinum, palladium, ruthenium, rhodium, iridium, and osmium, with platinum being preferred. The noble metal may exist within the final catalyst as a compound such as an oxide, a sulfide, a halide, or an oxyhalide, in chemical combination with one or more of the other ingredients of the composite or as an elemental metal. In one exemplary embodiment, the noble metal is present in an elemental state and is homogeneously dispersed within the carrier material.

The noble metal may be incorporated in the porous carrier material in any suitable manner, such as coprecipitation, ion-exchange or impregnation. One preferred method of preparing the catalyst can be impregnating the carrier material in a relatively uniform manner with a soluble, decomposable compound of noble metal. As an example, the component may be added to the support by commingling the latter with an aqueous solution of chloroplatinic, chloroiridic or chloropalladic acid. Other water-soluble compounds or complexes of noble metals may be employed in impregnating solutions and include one or more of an ammonium chloroplatinate, a bromoplatinic acid, a platinum trichloride, a platinum tetrachloride hydrate, a platinum dichlorocarbonyl dichloride, a dinitrodiaminoplatinum, a sodium tetranitroplatinate (II), a palladium chloride, a palladium nitrate, a palladium sulfate, a diamminepalladium (II) hydroxide, a tetramminepalladium (II) chloride, a hexamminerhodium chloride, a rhodium carbonylchloride, a rhodium trichloride hydrate, a rhodium nitrate, a sodium hexachlororhodate (III), a sodium hexanitrorhodate (III), an iridium tribromide, an iridium dichloride, an iridium tetrachloride, a sodium hexanitroiridate (III), a potassium or sodium chloroiridate, and potassium rhodium oxalate. The utilization of a platinum, iridium, rhodium, or palladium chloride compound, such as chloroplatinic, chloroiridic or chloropalladic acid or rhodium trichloride hydrate, is generally preferred. Generally, hydrogen chloride or other similar acid may also be added to the impregnation solution to further facilitate the incorporation of the halide component and the uniform distribution of the metallic components throughout the carrier material. Furthermore, it is generally preferred to impregnate the carrier material after it has been calcined in order to minimize the risk of washing away the noble metal.

Generally the noble metal is dispersed homogeneously in the catalyst. Preferably, dispersion of the noble metal is determined by Scanning Transmission Electron Microscope (herein may be abbreviated "STEM"), by comparing metal concentrations with an overall catalyst metal content. Alternatively, one or more noble metals may be present as a surface-layer component as described in, e.g., U.S. Pat. No. 4,677,094.

A Group 14 metal of the Periodic Table may also be included. Desirably, the Group 14 metal is germanium or tin, and tin is particularly preferred. The Group 14 metal may be present as an elemental metal, an oxide, a sulfide, a halide, or an oxychloride, or as a physical or chemical combination with the porous carrier material and/or other components of the catalyst. Preferably, a substantial portion of the Group 14 metal exists in the finished catalyst in an oxidation state above that of the elemental metal. The Group 14 metal, preferably tin, optimally is utilized in an amount sufficient to result in a final catalyst containing no more than about 5 wt %, desirably about 0.01 to about 5 wt %, calculated on an elemental basis based on the weight of the catalyst. Desirably, about 0.1 to about 2 wt % of the Group 14 metal calculated on an elemental basis based on the weight of the catalyst is included.

The Group 14 metal may be incorporated in the catalyst in any suitable manner to achieve a homogeneous dispersion, such as by coprecipitation with the porous carrier material, ion-exchange with the carrier material, or impregnation of the carrier material at any stage in the preparation. One method of incorporating the Group 14 metal into the catalyst composite may involve the utilization of a soluble, decomposable compound of a Group 14 metal to impregnate and disperse the metal throughout the porous carrier material. The Group 14 metal can be impregnated either prior to, simultaneously with, or after the other components are added to the carrier material. Thus, the Group 14 metal may be added to the carrier material by commingling the latter with an aqueous solution of a suitable metal salt or soluble compound, such as a stannous bromide, a stannous chloride, a stannic chloride, a stannic chloride pentahydrate, a germanium oxide, a germanium tetraethoxide, a germanium tetrachloride, a lead nitrate, a lead acetate, and a lead chlorate. The utilization of Group 14 metal chloride compounds, such as a stannic chloride, a germanium tetrachloride, or a lead chlorate is particularly preferred. When combined with hydrogen chloride during the especially preferred alumina peptization step described hereinabove, a homogeneous dispersion of the Group 14 metal may be obtained. Alternatively, one or more organic metal compounds such as a trimethyltin chloride and a dimethyltin dichloride are incorporated into the catalyst during the peptization of the inorganic oxide binder, and most preferably during peptization of an alumina with a hydrogen chloride or a nitric acid. A lanthanide-series metal of atomic numbers 57-71 of the Periodic Table may also be included. The lanthanide-series metal may include lanthanum, cerium, praseodymium, neodymium, promethium, samarium, europium, gadolinium, terbium, dysprosium, holmium, erbium, thulium, ytterbium and lutetium with cerium being preferred. The lanthanide-series metal may be present in any catalytically available form, such as an elemental metal, a compound such as an oxide, a hydroxide, a halide, an oxyhalide, an aluminate, or in chemical combination with one or more of the other ingredients of the catalyst. The lanthanide-series metal may be present in an oxidation state above that of the elemental metal, such as an oxide, an oxyhalide, a halide, or a mixture thereof. Preferably, oxidation and reduction stages are used in the preparation as hereinafter described.

The lanthanide-series metal may be concentrated in the surface layer of each catalyst particle. The surface-layer concentration is the average of measurements within a surface layer which is about 100 microns deep from an exterior surface. The concentration of surface-layer lanthanide-group metal tapers off from the surface to the center of the catalyst particle, which can be in a gradual or more abrupt fashion. For the spherical particles of the embodiments disclosed herein, the central core may be a spherical portion in the center of the particle having a diameter of about 50% of that of the spherical particle. The surface-layer component is measured as the concentration in the layer which extends 100 microns from the surface of the particle and the central core represents 50% of the diameter of the particle.

The lanthanide-metal, preferably cerium, is incorporated into the catalyst in any catalytically effective amount obtained with about 0.05 to about 2 wt % lanthanide on an elemental basis in the catalyst based on the weight of the catalyst. Preferably, about 0.2 to about 1 wt % lanthanide, calculated on an elemental basis, may be used based on the weight of the catalyst. The catalyst contains a noble metal, preferably platinum, in an amount less than about 0.6 wt % based on an elemental basis based on the weight of the catalyst, more preferably less than about 0.375 wt %.

An important feature of the present invention is the addition of alkali metals, alkaline earth metals or mixtures thereof. The catalyst will have 50 to 1000 wppm alkali metals and preferably 100 to 600 wppm alkali metals. It may have 250 to 5000 wppm alkaline earth metals and preferably 500 to 1500 wppm alkaline earth metals. Not wanting to be bound by theory, it is believed that the wppm alkali metals or alkaline earth metals tune the refractory aluminum oxide support acidity by doping specifically the strong Lewis sites and consequently increasing the paraffin conversion to aromatics while decreasing paraffin cracking resulting in lowering gas make, particularly the LPG produced.

The alkali metal or alkaline earth metal may be incorporated in the porous carrier material in any suitable manner, such as coprecipitation, ion-exchange or impregnation. One preferred method of preparing the catalyst can be impregnating the carrier material in a relatively uniform manner with a soluble, decomposable compound of the alkali metal or alkaline earth metal. The preferred compounds are halides and more preferred are chlorides such as, but not limited to, lithium chloride, sodium chloride, potassium chloride, rubidium chloride, cesium chloride, beryllium chloride, magnesium chloride, calcium chloride, strontium chloride and barium chloride. Other compound classes with promoter metals like nitrates, carbonates, acetates, tartrates, citrates, rhenates, tungstates, and molybdates may also be used. The alkali or alkaline earth metal can be introduced with the noble metal on lanthanide metals or in sequential steps before or after other metals. Intermediate drying and/or calcinations can be done between steps.

Optionally, the catalyst may also contain other components or mixtures thereof that act alone or in concert as catalyst modifiers to improve activity, selectivity or stability. Some known catalyst modifiers include rhenium, cobalt, nickel, iron, tungsten, molybdenum, chromium, bismuth, antimony, zinc, cadmium and copper. Catalytically effective amounts of these components may be added in any suitable manner to the carrier material during or after its preparation or to the catalyst before, during, or after other components are being incorporated.

Preferably, a metal component of the catalyst consists essentially of a noble metal, a Group 14 metal, an alkali metal or alkaline earth metal and a lanthanide-series metal. The catalyst has a noble metal content less than about 0.6 wt %, more preferably less than about 0.375 wt %, a Group 14 metal content of about 0.01 about 5 wt %, more preferably about 0.1 about 2 wt %, an alkali metal content of about 50 to about 1000 wppm, more preferably about 100 wppm to about 600 wppm, or an alkaline earth metal content of about 250 to about 5000 wppm, more preferably about 500 to about 1500 wppm, and a lanthanide-series metal content of about 0.05 to about 2 wt %, more preferably about 0.1 to about 1 wt %. All amounts are calculated on an elemental basis, based on the weight of the catalyst. The catalyst can have an average bulk density of about 0.300 to about 1.00 g/cc, preferably about 0.550 to about 0.750 g/cm³.

More preferably the metal component of the catalysts consists of platinum, tin, potassium and cerium. The catalyst has a platinum content less than about 0.6 wt %, more preferably less than about 0.375 wt %, a tin content of about 0.01 to about 5 wt %, more preferably about 0.1 to about 2 wt %, a potassium content of about 50 to about 1000 wppm, more preferably about 100 to about 600 wppm, and a cerium content of about 0.05 to about 2 wt %, more preferably about 0.1 to about 1 wt %. All amounts are calculated on an elemental basis, based on the weight of the catalyst. The catalyst can have an average bulk density of about 0.300 to about 1.00 g/cc, preferably about 0.550 to about 0.750 g/cm³.

Generally, at least one oxidation step is employed in the preparation of the catalyst. The oxidation step typically takes place at a temperature of about 370° to about 650° C. Typically, an oxygen atmosphere is employed with 1 to 21 mol % $O_2$. Generally, the oxidation step is carried out for a period of from about 0.5 to about 10 hours or more. This time will, of course, vary with the oxidation temperature employed and the oxygen content of the atmosphere employed.

In addition to the oxidation step, a halide adjustment step may also be employed in preparing the catalyst. The halide adjustment step may serve a dual function. First, the halide adjustment step may aid in homogeneous dispersion of the noble metal and other metals. Additionally, the halide adjustment step can serve as a means of incorporating the desired level of halide into the final catalyst. Usually, the halide adjustment step employs a halogen or halide-containing compound in air or an oxygen atmosphere. Because the preferred halide for incorporation into the catalyst can include chloride, the preferred halogen or halide-containing compound utilized during the halide adjustment step is chlorine, hydrogen chloride or the precursor of these compounds.

In carrying out the halide adjustment step, the catalyst is contacted with the halogen or halide-containing compound in air or an oxygen atmosphere at an elevated temperature of about 370° to about 650° C. It is further desired to have water present during the contacting step in order to aid in the adjustment. In particular, when the halide component of the catalyst may include chloride, it is preferred to use a mole ratio of water to hydrogen chloride of about 5:1 to about 100:1. The duration of the halogenation step is typically from about 0.5 to about 5 hours or more. Because of the similarity of conditions, the halide adjustment step may take place during the oxidation step. Alternatively, the halide adjustment step may be performed before or after the oxidation step as required by the particular method being employed to prepare the catalyst. Irrespective of the exact halide adjustment step employed, the halide content of the final catalyst should be such that there is sufficient halide to include, on an elemental basis, from about 0.1 to about 10 wt % based on the weight of the catalyst, more preferably from about 0.8 to about 1.2 wt %, more preferably less than about 1.1 wt %.

A reduction step is desired for preparing the catalyst. The reduction step can reduce substantially all of the noble metal to the corresponding elemental metallic state and to ensure a relatively uniform and finely divided dispersion of this component throughout the refractory inorganic oxide. Preferably, the reduction step takes place in a substantially water-free environment. Generally, the reducing gas is substantially pure, dry hydrogen, i.e., less than about 20 volume ppm water. However, other reducing gases may be employed such as carbon monoxide, nitrogen, or hydrogen containing light hydrocarbons. Typically, the reducing gas is contacted with the oxidized catalytic composite at conditions including a reduction temperature of about 315° to about 650° C. for a period of time of about 0.5 to about 10 or more hours effective to reduce substantially all of the noble metal to the elemental metallic state. The reduction step may be performed prior to loading the catalytic composite into a hydrocarbon conversion zone or it may be performed in situ as part of a hydrocarbon conversion process start-up procedure. However, if this latter technique is employed, proper precautions must be taken to pre-dry the conversion unit to a substantially water-free state, and a substantially water-free reducing gas should be employed. Optionally, the catalytic composite may be subjected to a presulfiding step. The optional sulfur component may be incorporated into the catalyst by any known technique.

In one exemplary embodiment, the catalyst may have a particular utility as a hydrocarbon conversion catalyst. Generally, the hydrocarbon, which is to be converted, is contacted with the catalyst at hydrocarbon-conversion conditions, including a temperature of about 40° to about 600° C., a pressure of about 100 to about 21,000 kPa, and a liquid hourly space velocity of about 0.1 to about 100 hr$^{-1}$. The catalyst is particularly suitable for catalytic reforming of gasoline-range feedstocks, and also may be used for, inter alia, dehydrocyclization, isomerization of aliphatics and aromatics, dehydrogenation, hydrocracking, disproportionation, dealkylation, alkylation, transalkylation, and oligomerization.

Generally, the reforming process is affected at conditions including a pressure selected within the range of about 100 to about 7,000 kPa, preferably about 350 to 2,500 kPa. The reforming temperature is about 315° to about 600° C., preferably about 425° to about 565° C. Typically, the initial selection of the temperature within this broad range is made primarily as a function of the desired octane of the product reformate considering the characteristics of the charge stock and of the catalyst. Depending on the regeneration method, the temperature thereafter can be slowly increased during the run to compensate for the inevitable deactivation that occurs to provide a constant octane product. Sufficient hydrogen is supplied to provide an amount of about 1 to about 20, preferably about 2 to about 10, moles of hydrogen per mole of hydrocarbon feed entering the reforming zone. Likewise, the liquid hourly space velocity is about 0.1 to about 20 hr$^{-1}$, preferably about 1 to about 5 hr$^{-1}$.

Preferably, the hydrocarbon feedstock is a naphtha feedstock including naphthenes and paraffins that boil within the gasoline range. The preferred feedstocks are naphthas consisting principally of naphthenes and paraffins, although, in many cases, aromatics will also be present. This preferred class includes straight-run gasolines, natural gasolines, and synthetic gasolines. Alternatively, it is frequently advantageous to charge thermally or catalytically cracked gasolines, partially reformed naphthas, or dehydrogenated naphthas. Mixtures of straight-run and cracked gasoline-range naphthas can also be used. The gasoline-range naphtha charge stock may be a full-boiling gasoline having an initial ASTM D-86 boiling point of from about 40° to about 80° C., and an end boiling point within the range of from about 160° to about 220° C., or may be a selected fraction thereof that generally has a higher-boiling fraction commonly referred to as a heavy naphtha. As an example, a naphtha boiling in the range of about 100° to about 200° C. may be considered a heavy naphtha. If the reforming is directed to production of one or more of benzene, toluene and xylenes, the boiling range may be about 60° to about 150° C. In some cases, it is also advantageous to process pure hydrocarbons or mixtures of hydrocarbons that have been recovered from extraction units. As an example, raffinates from aromatics extraction or straight-chain paraffins are to be converted to aromatics.

Desirably, the catalyst is utilized in a substantially water-free environment. Typically, the water level present in the feedstock and the hydrogen stream, which is being charged to the reforming zone, is controlled. Best results may be obtained when the total amount of water entering the conversion zone from any source is held to a level less than about 50 ppm, preferably less than about 20 ppm, expressed as weight of equivalent water in the feedstock. Generally, this can be accomplished by careful control of the water present in the feedstock and in the hydrogen stream. The feedstock can be dried by using any suitable drying means. Generally, the catalyst is operated in a substantially sulfur-free environment. Any suitable control means may be used to treat the naphtha feedstock, which is to be charged to the reforming reaction zone. As an example, the feedstock may be subjected to adsorption processes, catalytic processes, or combinations thereof. An adsorption process may employ a molecular sieve, a high surface area silica-alumina, a carbon molecular sieve, a crystalline aluminosilicate, an activated carbon, and a high surface area metallic containing a composition, such as nickel or copper. Usually, these feedstocks are treated by conventional catalytic pretreatment methods such as hydrorefining, hydrotreating, and hydrodesulfurization to remove substantially all sulfurous, nitrogenous and water-yielding contaminants therefrom, and to saturate any olefins that may be contained therein. Catalytic processes may employ traditional sulfur reducing catalysts known to the art including refractory inorganic oxide supports containing metals from Groups 6, 8-10, and 12 of the Periodic Table.

Typically, the hydrocarbon feedstock and a hydrogen-rich gas are preheated and charged to a reforming zone containing typically two to five reactors in series. Suitable heating means are provided between reactors to compensate for the net endothermic heat of reaction in each of the reactors. Reactants may contact the catalyst in individual reactors in either upflow, downflow, or radial flow fashion, with the radial flow mode being preferred. The catalyst may be contained in a fixed-bed system or, preferably, in a moving-bed system with associated continuous catalyst regeneration. Alternative approaches to reactivation of deactivated catalyst include semiregenerative operation, which includes shutting down the entire unit for catalyst regeneration and reactivation, or swing-reactor operation, which includes isolating a single reactor from the system, regenerating and reactivating while the other reactors remain on stream. Typically, continuous catalyst regeneration in conjunction with a moving-bed system is disclosed, inter alia, in, e.g., U.S. Pat. No. 3,647,680; U.S. Pat. No. 3,652,231; U.S. Pat. No. 3,692,496; and U.S. Pat. No. 4,832,921.

Generally, effluent from the reforming zone is passed through a cooling means to a separation zone, often maintained at about 0° to about 65° C., where a hydrogen-rich gas is separated from a liquid stream commonly called "unstabilized reformate". The resultant hydrogen stream can then be recycled through suitable compressing means back to the reforming zone. Usually, the liquid phase from the separation zone is withdrawn and processed in a fractionating system in order to adjust the butane concentration, thereby controlling front-end volatility of the resulting reformate.

ILLUSTRATIVE EMBODIMENTS

The following examples are intended to further illustrate the subject catalyst. These illustrations of embodiments of the invention are not meant to limit the claims of this invention to the particular details of these examples.

Example 1

Spherical reforming catalysts were made containing Pt, Sn, Cl, the lanthanide metal Ce, and the alkali metals K or Li. The alumina base was made via the oil drop method where the Sn was incorporated into the aluminum sol. For Catalyst A, the alumina base was impregnated with chloroplatinic acid with HCl and $H_2O$, dried, oxychlorinated and reduced. The sample was then further oxychlorinated at 510° C., and reduced in 15 mol % $H_2/N_2$ at 565° C. The composition of Catalyst A was 0.25 wt % Pt, 0.29 wt % Sn, and 1.04 wt % Cl.

Catalysts B, C and D were made on a similar alumina base as Catalyst A. The alumina base was impregnated with chloroplatinic acid and cerium chloride with HCl and $H_2O$, dried, oxychlorinated at 510° C., and reduced in 15 mol % $H_2/N_2$ at 565° C. (Catalyst B). The composition of Catalyst B was 0.25 wt % Pt, 0.3 wt % Sn, 1.03 wt % Cl and 0.58 wt % Ce.

For Catalyst C, the alumina base was impregnated with a solution of potassium chloride with $H_2O$, calcined, impregnated with chloroplatinic acid with HCl and $H_2O$, dried, oxychlorinated at 510° C., and reduced in 15 mol % $H_2/N_2$ at 565° C. (Catalyst C). The composition of Catalyst C was 0.25 wt % Pt, 0.29 wt % Sn, 1.06 wt % Cl and 0.007 wt % K (70 wppm).

For Catalyst D of this invention, the alumina base was impregnated with a solution of potassium chloride with $H_2O$, calcined, impregnated with chloroplatinic acid and cerium chloride with HCl and $H_2O$, dried, oxychlorinated at 510° C., and reduced in 15 mol % $H_2/N_2$ at 565° C. (Catalyst D). The composition of Catalyst D was 0.25 wt % Pt, 0.29 wt % Sn, 0.57 wt % Ce, 1.06 wt % Cl and 0.007 wt % K (70 wppm).

For Catalysts E, I and N, the alumina base was impregnated with chloroplatinic acid with HCl and $H_2O$, dried, oxychlorinated and reduced. The compositions of Catalysts E, I and N were 0.29 wt % Pt, 0.3 wt % Sn, and 1.02 wt % Cl.

Catalysts F, G, H, J, M, O, P, Q were made on a similar alumina base as Catalysts E, I and N. The compositions of Catalysts F, J, O were 0.29 wt % Pt, 0.3 wt % Sn, 1.0 wt % Cl and 0.25 wt % Ce. The composition of Catalyst G was 0.29 wt % Pt, 0.3 wt % Sn, 1.03 wt % Cl and 0.04 wt % K (400 wppm). The composition of Catalyst H of this invention was 0.29 wt % Pt, 0.3 wt % Sn, 0.25 wt % Ce, 1.02 wt % Cl and 0.03 wt % K (300 wppm). The composition of Catalyst M of this invention was 0.29 wt % Pt, 0.3 wt % Sn, 0.25 wt % Ce, 1.02 wt % Cl and 0.05 wt % K (500 wppm). The composition of Catalyst P was 0.29 wt % Pt, 0.3 wt % Sn, 1.02 wt % Cl and 0.015 wt % Li (150 wppm). The composition of Catalyst Q of this invention was 0.29 wt % Pt, 0.3 wt % Sn, 0.25 wt % Ce, 1.02 wt % Cl and 0.015 wt % Li (150 wppm).

Example 2

This example demonstrates the increase in desired total aromatic yields and the decrease in the less desired $C_1$ to $C_4$ light ends obtained on reforming catalysts made by combining the alkali metals and lanthanide metals. All catalysts were pilot plant tested in reforming pilot plants at a constant research octane of 104.3 by continuously increasing the furnace temperatures. The conditions were hydrogen/hydrocarbon mole ratio of 3, 1.7 $hr^{-1}$ liquid hourly space velocity, and 345 kPa (50 psig) reactor pressure. The naphtha feed for each run was substantially the same and contained paraffins, naphthenes and aromatics.

Catalysts A, B, C and D were pilot plant tested. The following Table shows the total aromatics and light end yields for these catalysts and the delta yields as compared to Catalyst A. The addition of 70 wppm of K and 0.57 wt % Ce (Catalyst D of this invention) resulted in a total aromatic yield higher than reference Catalyst A made with no lanthanide or alkali metals, higher than Catalyst B which contained the lanthanide metal but no alkali metal, and higher than Catalyst C which contained the alkali metal but no lanthanide metal. The following Table further shows a benefit for Catalyst D in reduced lights-ends $C_1+C_2$ and $C_3+C_4$ yields compared to Catalysts A, B and C. Therefore, the addition of alkali metals and lanthanide metals offers an advantage towards higher aromatics yields over catalysts with no additives, or with only one of the two additives. Not being bound by theory, we believe that the lanthanide metal is attenuating certain types of acid and/or metal sites while the alkali metals are attenuating different types of acid and/or metal sites, such that, surprisingly, the combination produces an improved overall modification than each individual promoter leading to higher aromatic yields and lower production of light ends.

Example 3

Catalyst E, F, G and H were pilot plant tested. The following Table shows the results of the tests and the delta yields compared to the reference Catalyst E. The addition of 300 wppm K and 0.25 wt % Ce (Catalyst H of this invention) resulted in a total aromatic yield higher than reference Catalyst E made with no lanthanide or alkali metals, higher than Catalyst F which contained the lanthanide metal but no alkali metal, and higher than Catalyst G which contained the alkali metal but no lanthanide metal. The following Table further shows a benefit for Catalyst H in reduced lights-ends $C_1+C_2$ and $C_3+C_4$ yields compared to Catalysts E, F and G.

Example 4

Catalysts N, O, P and Q were pilot plant tested with results shown in the following Table. The addition of 150 wppm Li and 0.25 wt % Ce (Catalyst Q of this invention) resulted in a total aromatic yield higher than reference Catalyst N made with no lanthanide or alkali metals, higher than Catalyst O which contained the lanthanide metal but no alkali metal, and higher than Catalyst P which contained the alkali metal but no lanthanide metal. The following Table further shows a benefit for Catalyst Q in reduced lights-ends $C_1+C_2$ and $C_3+C_4$ yields compared to Catalysts N, O and Q.

Example 5

Additional pilot plant testing was done on Catalysts I, J and M with results shown in the following Table. It was found that a catalyst with 500 wppm K (Catalyst M) has lower aromatics yield delta compared to Catalyst G with 400 wppm K. This result implies that levels above 500 wppm K would lead even lower yields.

The delta total aromatic yields from the following Table for each catalyst were plotted in the FIGURE versus the total lanthanide metal plus alkali metal content in each catalyst. The FIGURE shows that when comparing at a given total additive level, the largest benefit in total aromatics occurs for a combination of lanthanide metal and alkali metal.

From the foregoing description, one skilled in the art can easily ascertain the essential characteristics of this invention and, without departing from the spirit and scope thereof, can make various changes and modifications of the invention to adapt it to various usages and conditions.

TABLE

| Catalyst | A | B | C | D | E | F | G | H |
|---|---|---|---|---|---|---|---|---|
| Compositions | | | | | | | | |
| Pt, wt % | 0.25 | 0.25 | 0.25 | 0.25 | 0.29 | 0.29 | 0.29 | 0.29 |
| Sn, wt % | 0.29 | 0.30 | 0.29 | 0.29 | 0.30 | 0.30 | 0.30 | 0.30 |
| Cl, wt % | 1.04 | 1.03 | 1.06 | 1.06 | 1.02 | 1.00 | 1.03 | 1.02 |
| Additive wt % basis | | | | | | | | |
| Ce, wt % | — | 0.58 | — | 0.57 | — | 0.25 | — | 0.25 |
| K, wt % | — | — | 0.007 | 0.007 | — | — | 0.04 | 0.03 |
| Li, wt % | — | — | — | — | — | — | — | — |
| Total added, wt % | 0 | 0.580 | 0.007 | 0.577 | 0 | 0.25 | 0.04 | 0.28 |
| Pilot Plant | | | | | | | | |
| Temperature, ° C. | 510 | 514 | 512 | 516 | 515 | 514 | 518 | 519 |
| Total Arom, wt % | 69.9 | 71.2 | 70.2 | 71.4 | 71.6 | 71.9 | 72.6 | 72.8 |
| ΔTA, wt % | 0 | 1.3 | 0.3 | 1.5 | 0 | 0.3 | 1.0 | 1.2 |
| C1 + C2, wt % | 3.28 | 2.92 | 3.14 | 2.86 | 2.29 | 2.21 | 2.11 | 2.02 |
| C3 + C4, wt % | 7.57 | 6.71 | 7.44 | 6.54 | 6.34 | 6 | 5.32 | 5.19 |
| C1 – C4, wt % | 10.85 | 9.63 | 10.58 | 9.40 | 8.63 | 8.21 | 7.43 | 7.21 |
| Δ(C1– C4), wt % | 0 | −1.22 | −0.27 | −1.45 | 0 | −0.42 | −1.20 | −1.42 |
| Molar Ratios | | | | | | | | |
| Lanthanide/Noble | — | 3.23 | — | 3.17 | — | 1.20 | — | 1.20 |
| Lanthanide/Alkali | — | — | — | 22.7 | — | — | — | 2.3 |
| Alkali/Noble | — | — | 0.14 | 0.14 | — | — | 0.69 | 0.52 |

| Catalyst | I | J | M | N | O | P | Q |
|---|---|---|---|---|---|---|---|
| Compositions | | | | | | | |
| Pt, wt % | 0.29 | 0.29 | 0.29 | 0.29 | 0.29 | 0.29 | 0.29 |
| Sn, wt % | 0.30 | 0.30 | 0.30 | 0.30 | 0.30 | 0.30 | 0.30 |
| Cl, wt % | 1.02 | 1.00 | 1.00 | 1.02 | 1.00 | 1.02 | 1.02 |

TABLE-continued

| Additive wt % basis | | | | | | | |
|---|---|---|---|---|---|---|---|
| Ce, wt % | — | 0.25 | — | — | 0.25 | — | 0.25 |
| K, wt % | — | — | 0.05 | — | — | — | — |
| Li, wt % | — | — | — | — | — | 0.015 | 0.015 |
| Total added, wt % | 0 | 0.25 | 0.05 | 0 | 0.25 | 0.015 | 0.265 |
| Pilot Plant | | | | | | | |
| Temperature, °C. | 526 | 529 | 533 | 516 | 518 | 521 | 521 |
| Total Arom, wt % | 73.3 | 73.9 | 74.0 | 71.7 | 72.3 | 72.7 | 72.9 |
| ΔTA, wt % | 0 | 0.6 | 0.7 | 0 | 0.6 | 1 | 1.2 |
| C1 + C2, wt % | 2.15 | 1.98 | 1.95 | 2.9 | 2.81 | 2.78 | 2.63 |
| C3 + C4, wt % | 4.81 | 4.42 | 4.22 | 6.99 | 6.59 | 6.46 | 6.07 |
| C1 − C4, wt % | 6.96 | 6.40 | 6.15 | 9.89 | 9.4 | 9.24 | 8.70 |
| Δ(C1 − C4), wt % | 0 | −0.56 | −0.81 | 0 | −0.49 | −0.65 | −1.19 |
| Molar Ratios | | | | | | | |
| Lanthanide/Noble | — | 1.20 | — | — | 1.20 | — | 1.20 |
| Lanthanide/Alkali | — | — | — | — | — | — | 0.83 |
| Alkali/Noble | — | — | 0.86 | — | — | 1.45 | 1.45 |

The invention claimed is:

1. A reforming process, comprising:
   a) charging a hydrocarbon feedstock and a hydrogen-rich gas to a reforming zone; and
   b) contacting the hydrocarbon feedstock and the hydrogen rich gas in a reactor in the reforming zone wherein the catalyst comprises:
      1) platinum;
      2) potassium or lithium;
      3) cerium; and
      4) a support; wherein an average bulk density of the catalyst is about 0.300 to about 1.00 gram per cubic centimeter, a platinum content less than about 0.6 wt %, a potassium content of about 50 to about 1000 wppm, and a cerium content of about 0.05 to about 2 wt %.

2. The reforming process according to claim 1, further comprising continuously regenerating the catalyst.

3. The reforming process according to claim 1, wherein the platinum content is about 0.25 wt %, the cerium content is about 0.6 wt % and the potassium content is about 300 wppm.

4. The reforming process according to claim 1, wherein the cerium content is about 0.1 to about 0.5 wt %, and the potassium content is about 300 to about 600 wppm.

5. The reforming process according to claim 1, wherein the cerium content is about about 0.25 wt %, and potassium content is about 100 to about 300 wppm.

6. The reforming process according to claim 1, wherein the cerium is distributed at a concentration of the cerium in a 100 micron surface layer of the catalyst less than about two times a concentration of the cerium at a central core of the catalyst.

7. The reforming process according to claim 1, wherein the average bulk density of the catalyst is about 0.550 to about 0.750 gram per cubic centimeter.

8. The reforming process according to claim 1, wherein the catalyst further comprises a Group 14 metal of the Periodic Table.

9. The reforming process according to claim 1, wherein the catalyst further comprises tin.

10. The reforming process according to claim 9, wherein the catalyst comprises no more than about 5%, by weight, tin.

11. The reforming process according to claim 1, wherein the catalyst further comprises a halide.

12. The reforming process according to claim 11, wherein the halide comprises chloride with a content of about 0.8 to about 1.2 wt %.

13. The reforming process according to claim 11, wherein the halide comprises chloride with a content of about less than 1.1 wt %.

14. The reforming process according to claim 1, wherein the support comprises an alumina.

* * * * *